United States Patent [19]

Schaefer et al.

[11] 4,071,342
[45] Jan. 31, 1978

[54] APPARATUS FOR FORMING GLASS FIBERS

[75] Inventors: William L. Schaefer, Gibsonia; Thomas J. Briar, Trafford, both of Pa.

[73] Assignee: PPG Industries, Inc., Pittsburgh, Pa.

[21] Appl. No.: 775,482

[22] Filed: Mar. 8, 1977

[51] Int. Cl.² ............................................. C03B 37/00
[52] U.S. Cl. .................................... 65/11 R; 65/3 R; 118/238
[58] Field of Search ............... 65/3 R, 3 A, 3 B, 3 C, 65/11 W, 4 R; 118/238

[56] References Cited

U.S. PATENT DOCUMENTS

| | | | |
|---|---|---|---|
| 2,772,518 | 12/1956 | Whitehurst et al. | 65/11 W X |
| 3,356,565 | 12/1967 | Smucker et al. | 162/199 |
| 3,378,395 | 4/1968 | Faber | 117/120 |
| 3,560,178 | 2/1971 | Minkler | 65/11 |
| 3,585,015 | 6/1971 | Hohlfeld et al. | 65/3 |
| 3,788,826 | 1/1974 | Klink et al. | 65/11 W |
| 3,817,728 | 6/1974 | Petersen | 65/3 R |
| 3,820,967 | 6/1974 | Johnson | 65/2 |
| 3,827,397 | 8/1974 | Hebberling | 118/50 |
| 3,844,497 | 10/1974 | Harrill et al. | 242/36 |
| 3,848,565 | 11/1974 | Schweppe | 118/234 |
| 3,873,290 | 3/1975 | Marzocchi | 65/11 W X |
| 3,999,970 | 12/1976 | Barch et al. | 65/2 |

*Primary Examiner*—Arthur D. Kellogg
*Attorney, Agent, or Firm*—Alan T. McDonald; John E. Curley

[57] ABSTRACT

An apparatus for producing glass fibers is disclosed. The apparatus includes means associated with an applicator for moving the glass filaments from the surface of the applicator when waste filaments are being produced such that the glass filaments are brought into contact with the application surface for coating the filaments with a binder and/or size only when production quality strand is being produced. This substantially reduces binder and/or size consumption and prevents the operator of the forming position from coming into physical contact with the binder and/or size coated strand.

11 Claims, 3 Drawing Figures

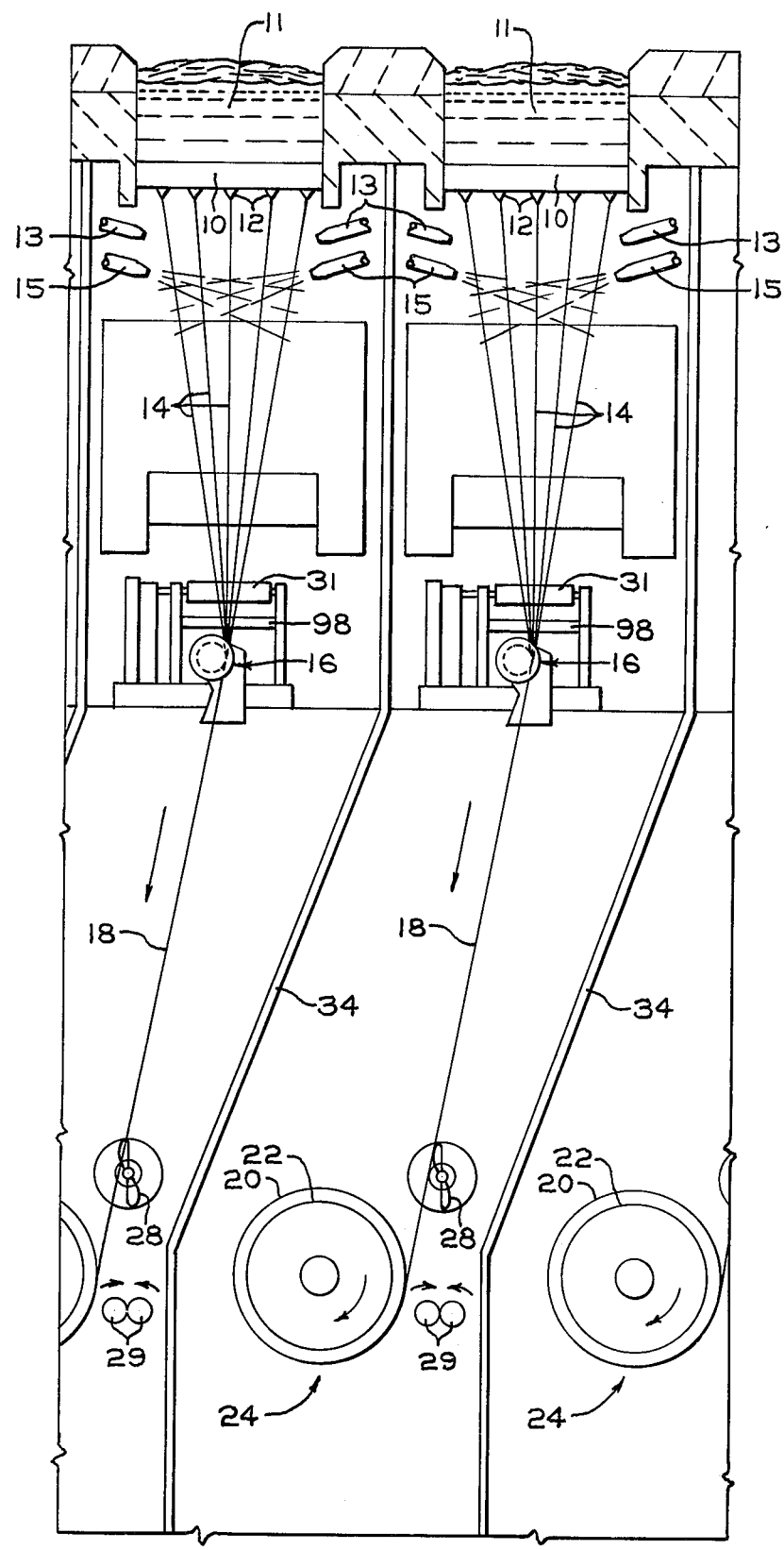
F I G. 1

APPARATUS FOR FORMING GLASS FIBERS

BACKGROUND OF THE INVENTION

Glass strand is typically formed by attenuating filaments through orifices or tips at the bottom of a heated bushing containing molten glass. The filaments may be cooled by spraying them with water as they leave the bushing. The filaments are then passed across the application surface of an applicator where they are coated with a binder and/or size. The coated filaments are then gathered into strand form in a gathering shoe, which is typically a grooved cylinder or wheel formed of a material such as graphite. The strand may then be traversed across the face of a rotating spiral and wound as a forming package on a rotating collet carried by a winder. In another operation, the strand from the gathering shoe may be passed between cutting blades and chopped into particulate glass fiber strands. In a further alternative, the strand may be pulled between belts, wheels and the like of an attenuator and packaged in a container.

In any of the above operations, a significant amount of waste glass fiber strand is produced. In most of the above described operations, inconsistent diameter filaments result during start-up and slow down of the systems due to the fact that the filament diameter is inversely proportional to the speed of attenuation for a given bushing.

Further, such occurrences as low speed attenuation during doffing of the forming package, restarting the strand formation after a strand breakout, and the like are all examples of instances where the formation of waste strand occurs.

In the past, waste filaments were passed through the forming operation in the same manner as production quality filaments until they had passed the gathering shoe and were formed into strand. Only at this point were they segregated as waste. All of the waste strands and the filaments forming them were coated with the binder and/or size, in the same manner as the production quality material. Since binder and/or size which is coated onto filaments cannot be recovered, and since waste strand may represent up to about 15 percent of the production of a typical glass fiber forming position or more, it is obvious that the prior art strand formation methods consume a significant amount of binder and/or size which is in actuality being discarded as waste. It is, therefore, desirable to eliminate or substantially reduce the amount of binder and/or size which is wasted by being coated onto waste filaments.

A second problem encountered with the continual coating of filaments with binder and/or size occurs from the necessity of the forming level operator to manually handle the strands during such operations as start-up, and other occurrences of a glass fiber forming operation. To begin the winding of a new forming package on a collet, to begin the chopping of strand, to thread an attenuator, and to restart any of these attenuation devices after a breakout of strand occurs, the operator normally feeds strand to the operation manually. This requires physical contact between the operator's skin and the coated strand. Some binders and/or sizes may have adverse dermatological effects on an operator's skin from the constant physical contact of the operator's hands with coated strands. It is also desirable, therefore, to reduce substantially or eliminate physical contact between the operator and glass strand having irritating binders and/or sizes coated thereon.

A method for reducing both binder and/or size consumption and physical contact with binder and/or size coated strand is disclosed in concurrently filed application Ser. No. 775,483 of David M. Griffiths, which is incorporated herein by reference. The present invention provides apparatus to carry out the method of the copending application.

THE PRESENT INVENTION

By means of the present invention, both binder and/or size waste and physical contact between the operator and coated glass strands can be substantially reduced. Generally, the present invention involves apparatus for moving glass filaments from application surfaces of an applicator during attenuation of waste filaments and their formation into waste strands. A bar is located either above or below the applicator. This bar may be extended and retracted. When waste filaments are being produced, the bar is extended and the waste filaments pass across this bar. During this time the filaments are out of contact with the application surface and thus are not coated with the binder and/or size, but merely with a lubricant from a spray located above the applicator. The filaments without binder and/or size thereon are then passed across the gathering shoe and are formed into waste strand where they can be, for example, attenuated at low speeds prior to start-up of the collection operation, wound on the edge of a forming package during start-up of a winder and the like. After the operator has secured the strand into the attenuation device, and just prior to collecting production quality strand, the bar, whether it be located above or below the applicator, is pulled away from the filaments to allow the filaments to return into contact with the application surface, so that all production strand is coated with the desired binder and/or size.

BRIEF DESCRIPTION OF THE DRAWINGS

The fiber forming system of the present invention will be described with reference to the drawing figures in which:

FIG. 1 is a front elevational view of a glass fiber forming and winding operation incorporating the apparatus of the present invention;

DETAILED DESCRIPTION OF THE DRAWINGS

Figure 2:
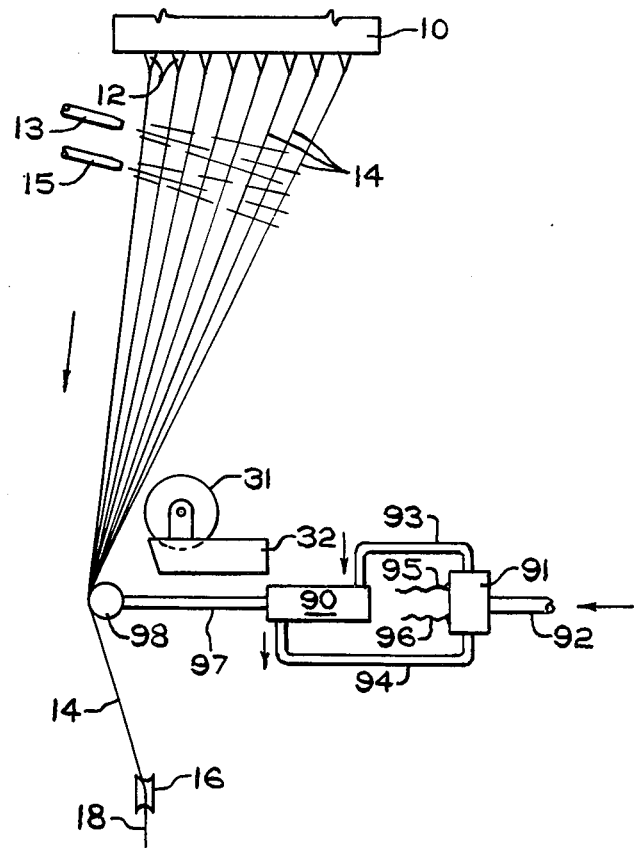
FIG. 2 is an enlarged side elevational view of a bar member located below the applicator and positioned to move the filaments from the application surface.

Turning to FIG. 1, glass filaments 14 are attenuated through bushing tips 12 located at the bottom of a heated glass fiber forming bushing 10 containing molten glass 11. The filaments 14 may be sprayed with water by spray jets 15 as they leave the bushing tips 12 to cool them, depending upon the type of filaments being produced. The filaments 14 are passed across the application surface 31 of an applicator 32 where they are coated with binder and/or size. This applicator will be more completely described below. The filaments 14 are then passed into the groove of a gathering shoe 16, which is typically a grooved cylinder or wheel formed of a material such as graphite, where they are gathered into one or more unified strands 18.

In FIG. 1, the strand 18 is then traversed across the face of a rotating spiral 28 and collected as a forming package 20 on a rotating collet 22 carried on a winder 24. Optionally, the strand may be attenuated by a chopper, belt attenuator, wheel attenuator and the like, instead of the rotating collet 22.

While the operator is doffing or changing forming packages, repairing a strand breakout, and the like, the strand 18 is moved from the spiral 28 and collet 22 and is passed between a pair of driven rollers 29 at a relatively low speed to a waste area (not shown).

Figure 3:
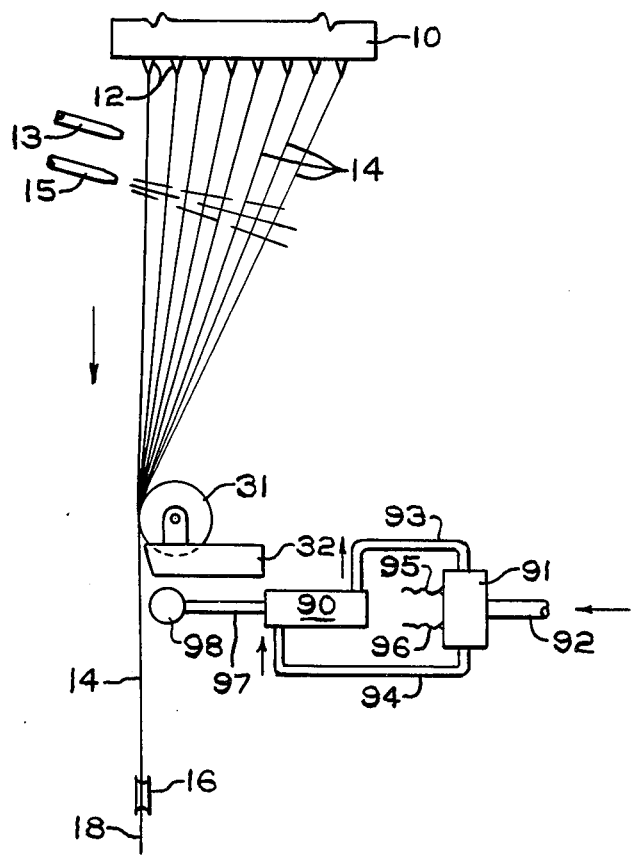
FIG. 3 is an enlarged side elevational view of the apparatus of FIG. 2 with the bar retracted to allow the filaments to contact the application surface.

The preferred apparatus for moving the strand from the application surface 31 is shown in FIGS. 2 and 3. In this apparatus, a bar 98 is located below the applicator 32. Of course, this bar 98 could be located above the applicator 32. When it is desired to move the filaments 14 from the application surface 31, a signal is given to a solenoid valve 91 through electric lines 95 and 96. The valve 91 permits air to flow from intake 92 through line 93 to air cylinder 90. This extends piston 97 outwardly from the cylinder 90. The rod 98, connected to piston 97, contacts the filaments 14 as the piston 97 is extended and moves the filaments from the application surface 31 of the applicator 32. While illustrated as a horizontal movement, the bar 98 may move at any desired angle. The only requirement is that the movement be sufficient to move the filaments 14 from the application surface 31. When production quality strand is again being produced, a reversing signal is given to electric lines 95 and 96 and to solenoid valve 91 which in turn shifts the air flow from intake 92 to line 94, retracting the piston 97 and the bar or rod 98 and allows the filaments 14 to again contact the application surface 31 of the applicator 32. The bar 98 is formed of material which will not easily be damaged by the filaments 14, such as brass or graphite.

When the filaments 14 are moved from the application surface 31, they are sprayed with a lubricant from spray nozzle 13. If the production quality filaments 14 are being sprayed by jets 15 during production, the spray from spray nozzle 13 may be in addition to that spray. The lubricant sprayed onto the filaments from nozzle 13 may be water alone or may include an additional lubricant, but is not the binder and/or size contained in the applicator 32.

Optionally, instead of the spray jets 13, a stream of the lubricant could be applied to the filaments 14 by flowing the lubricant onto the gathering shoe 16 in sufficient quantities for the filaments 14, such as by means of a trickle tube connected to the source of lubricant, a sprayer, or any other convenient means.

Suitable lubricants which may be employed are employed in amounts which are sufficient to provide lubricity to the strands, such amounts being about 4 to 15 percent by weight of a water mixture of the lubricant. Typical lubricants are alkyl imidazoline derivatives such as described in U.S. Pat. Nos. 2,200,815; 2,267,965; 2,268,273 and 2,355,837 which are incorporated herein by reference.

Cation X is an example of such a material wherein the alkyl imidazoline derivative is the reaction product of stearic acid, tetraethylene pentamine and acetic acid. Acid solubilized under dispersible stearic amides and anhydrous acid solubilized water dispersible lower molecular weight fatty acid amides as well as anhydrous acid solubilized polyunsaturated lower molecular weight fatty acid amides can also be used as lubricants.

While the solenoid valve employed in the present invention may be manually tripped by the operator, such as by providing a button or switch, it is preferred that strand moving system be operated automatically. Hence, for example, the signal to the solenoid valve may be linked to the speed of the attenuation device such that when the attenuator is operating at production speed the strand moving device is in its retracted position and whenever the attenuator is operating such that production filaments are not being produced the strand moving apparatus is extended or activated, along with the spray 13 or other lubricant supply.

When operating a fiber forming operation according to the present invention, the operator need not come into physical contact with the strand while it is coated with binder and/or size. At all times that physical contact with the strand may be necessary the filaments are removed from the applicator surface.

In addition, since little or no waste strand is coated with the binder and/or size, significant reductions in cost are possible due to the reduced amounts of binder and/or size necessary.

From the foregoing, it is obvious that the present invention provides an efficient apparatus for forming glass fiber strands, both in cost reduction and safety for the operator.

While the invention has been described with reference to specific embodiments thereof, it is not intended to be so limited thereby except as insofar as in the accompanying claims.

We claim:

1. In an apparatus for forming glass fibers comprising a bushing having a plurality of bushing tips through which filaments are attenuated, an applicator having an application surface for applying binder and/or size to the filaments, a gathering means to combine the filaments into a unified strand and means for collecting the strand, the improvement comprising an extendable and retractable bar associated with the applicator for removing the filaments from the application surface of the applicator during attenuation of waste strand such that said waste strand is not coated with said binder and/or size, means for applying a lubricant other than said binder and/or size to waste filaments during attenuation of waste strand and means to coordinate the actions of said bar and said means for applying lubricant to activate said means for applying lubricant as said bar lifts said filaments from said application surface.

2. The apparatus of claim 1 wherein said means for applying lubricant onto said waste filaments comprises a spray jet.

3. The apparatus of claim 2 further comprising an additional spray jet for spraying lubricant onto the filaments.

4. The apparatus of claim 1 wherein said means for collecting strand comprises a rotating collet.

5. The apparatus of claim 1 wherein said means for collecting strand comprises a chopper.

6. The apparatus of claim 1 wherein said means for collecting strand comprises an attenuator.

7. The apparatus of claim 1 wherein said bar is located below said applicator.

8. The apparatus of claim 1 wherein said bar is located above said applicator.

9. The apparatus of claim 1 wherein said bar is extended and retracted by an air cylinder.

10. The apparatus of claim 1 wherein said bar is formed of graphite.

11. The apparatus of claim 1 wherein said bar is formed of brass.

* * * * *